(No Model.)
L. WAGNER, J. MARR & H. CAMPBELL.
PROCESS OF FILTERING OR PURIFICATION OF LIQUIDS.
No. 517,499. Patented Apr. 3, 1894.
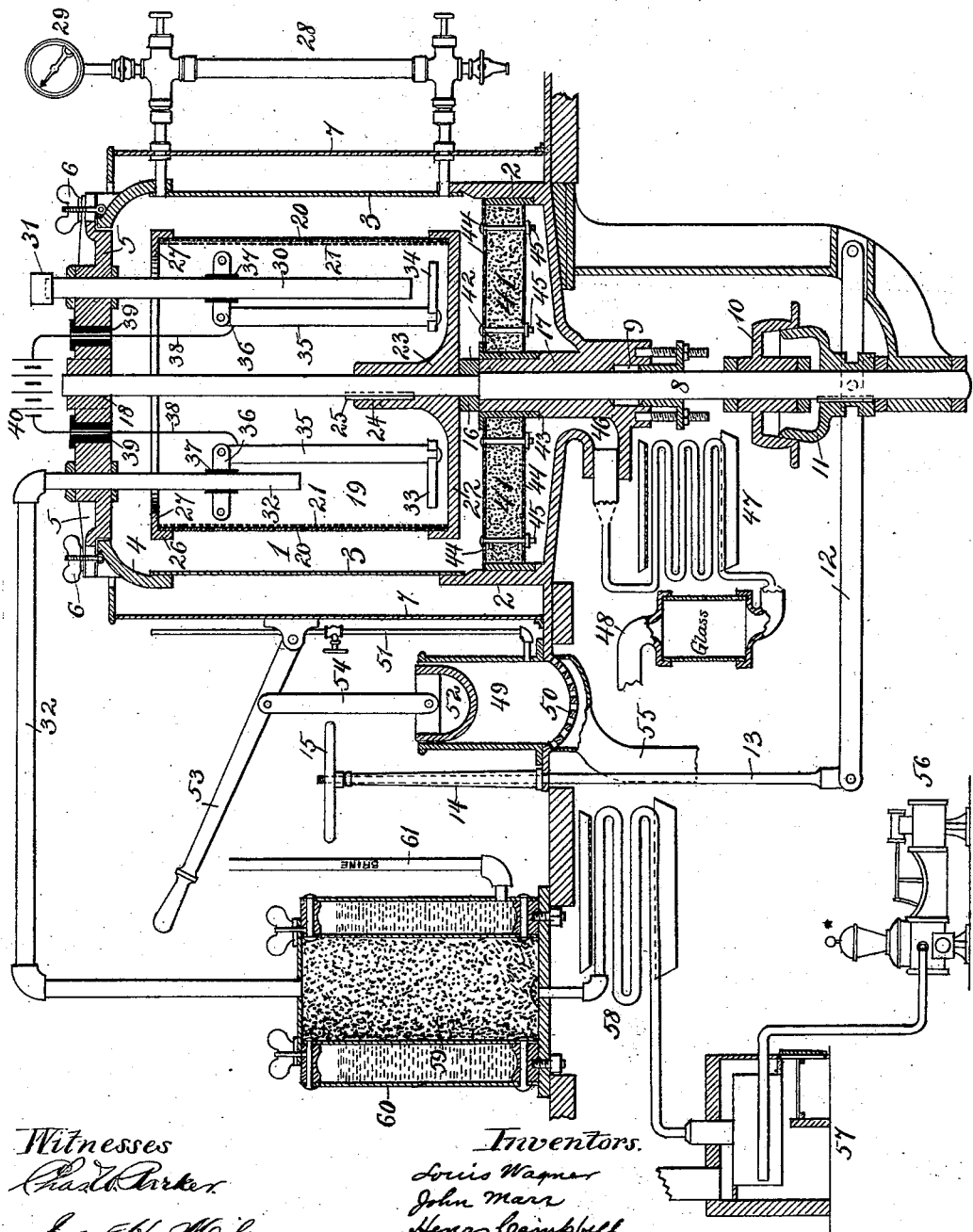
Witnesses
Chas. P. Parker
Jos. H. McIlvane.
Inventors.
Louis Wagner
John Marr
Henry Campbell
by H. N. Low attorney.

UNITED STATES PATENT OFFICE.

LOUIS WAGNER, JOHN MARR, AND HENRY CAMPBELL, OF BALTIMORE, MARYLAND.

PROCESS OF FILTERING OR PURIFICATION OF LIQUIDS.

SPECIFICATION forming part of Letters Patent No. 517,499, dated April 3, 1894.

Application filed September 12, 1893. Serial No. 485,330. (No model.)

*To all whom it may concern:*

Be it known that we, LOUIS WAGNER, JOHN MARR, and HENRY CAMPBELL, citizens of the United States, residing at Baltimore, in the State of Maryland, have invented certain new and useful Improvements in Filtering or Purification of Liquids; and we do declare the following to be a full, clear, and exact description of the invention, such as will enable others skilled in the art to which it appertains to make and use the same.

It is the object of our invention to effect the purification of liquids, especially those designed for, or employed in the manufacture of, beverages, such for example as lager-beer, ale, porter, wines, water, &c. This we effect by destroying the life of organisms in the liquid, promoting their precipitation, and removing them from the liquid in the manner or by the improved means hereinafter set forth and claimed.

In order to make our improvement more clearly understood we have shown in the accompanying drawing the means for carrying it into practical effect, without however limiting the invention in its useful applications, to the particular construction which, for the sake of illustration, we have delineated.

In said drawing the figure is a sectional view on a vertical plane of an apparatus containing certain features of, and adapted to carry out our invention.

Referring to the drawing, 1 indicates a casing comprising a base 2 preferably formed of cast metal, a cylinder or barrel 3 which may be of sheet metal, a top ring 4 and a removable cover 5, the latter being adapted to be secured when in place by screw clamps 6. This casing for certain purposes of our invention we prefer to make air and gas tight, but for all uses of the apparatus this is not necessary.

Exterior to the casing 1 and mounted upon a suitable flange of the base 2 we provide a jacket 7 which may be of sheet metal, and which is adapted to contain a brine or other means of cooling the casing and its contents.

8 is a vertical rotary shaft passing upward through a stuffing box 9 in the center of the base 2 and provided with a loose-pulley 10 adapted to be actuated by a constantly running belt (not shown). Rotary motion is adapted to be communicated to the said shaft at pleasure by means of a clutch member 11 rotating with the shaft and adapted to be moved longitudinally thereon, and which may be caused to engage the pulley 10 by means of a shifting lever 12 operated by a screw-threaded rod 13 which passes through a bearing post 14 and is provided with a hand-wheel 15, which latter also constitutes a screw-threaded nut engaging the end of the said rod and resting upon the bearing post. Or an electric motor controlled by a switch in the usual manner may be connected with said shaft. The shaft 8 has fixed thereon a supporting collar 16 which rests upon the upper end of a bearing 17 cast with or secured in the base 2. The upper end of the shaft is preferably extended to such height as to find a support in a bearing 18 formed in the cover 5.

19 is a vessel mounted upon the shaft 8 so as to be rotated thereby and situated within the casing 1. A centrifugal force for certain purposes of our invention may be produced in the liquid contained in this vessel by its rotation, whether or not the vessel constitutes a filter or strainer or be provided with filtering or straining means, but preferably the vessel 19 is so constructed as to perform the office not only of causing such centrifugal forces to act in the contained liquid but also so as to filter or strain the latter. To this end its barrel or cylinder consists of a perforated sheet metal casing 20, within which is supported a fine wire or other sieve or strainer 21. The said parts 20 and 21 are secured to and supported by a base plate 22 of cast metal, the center of which is formed with a hub 23 having a groove 24. This hub fits over the shaft 8 so that the plate 22 rests upon the collar 16 and the said groove 24 is engaged by a rib 25 secured in the shaft. At their upper ends the parts 20 and 21 are provided with a strengthening ring 26 having an inwardly extending retaining flange 27.

28 is a liquid gage communicating with the upper and lower portions of the casing 1 and adapted to indicate the height and character of the liquid therein, which gage is preferably provided at its upper end with a pressure gage 29 adapted to indicate the air or gas pressure in the casing.

The pipe for the introduction of liquid within the casing is indicated at 30 which passes through the cover 5 to a point near the bottom of and within the vessel 19. At its outer end the pipe 30 is provided with a suitable coupling 31 by which it may be readily attached to or detached from the conduit (not shown) through which the liquid is conveyed to the apparatus. 32 is a similar pipe passing through the cover 5 at another point or passing through some other stationary portion of the casing 1, and adapted to deliver within the casing such amount of sterilized air, or of carbonic acid gas, as may be desired to maintain a considerable pressure upon the surface of the liquid which is being treated. One important function of such pressure is to prevent the foaming, aeration and expansion of the liquid while under the agitation produced by the rotation of the vessel 19.

33 and 34 indicate positive and negative electrodes of carbon or other suitable material situated within the casing 1 and preferably within and at or near the bottom of the vessel 19. These electrodes are supported by conductors 35, and the latter by clamps 36 provided with insulating bushings 37 and secured upon the pipes 32 and 30.

38 indicates insulated conductors passing to the conductors 35 through the cover 5, in which latter they are surrounded by insulating plugs 39. These conductors receive a suitable current of electricity, say one of one hundred volts, from any suitable generator, which latter is indicated diagrammatically at 40.

41 is a filter or strainer bed situated in the bottom of the casing 1. By preference we provide said bed with a central sleeve 42 adapted to be passed over the upper end of the bearing 17 and to rest upon a shoulder 43 thereof. The outer edge of said bed rests upon suitable supports on the base 2. The filter bed is in the form of a flat cylinder or ring, the upper and lower faces of which are formed by perforated metal plates 44 held together by bolts 45 or other suitable means. Between the plate 44 the filtering material is secured, consisting preferably of sponge cut into small pieces and packed tightly together but sufficiently opened to permit the free passage of the liquid to be operated upon. The exit from the casing 1 is formed through the base 2 at 46, and all the liquid admitted by the pipe 30 is compelled to pass through the filtering bed 41 before it reaches said exit. The pipe from the latter is adapted to conduct the liquid to a cooling apparatus indicated diagrammatically at 47, and from thence through a pipe 48 to such point as it is consumed, stored, or further treated.

By removing the cover 5 with its supported parts, and the vessel 19, the filter bed 41 can be detached and its contained filtering material washed and cleaned. To facilitate this operation we provide a receptacle 49 having a perforated bottom 50 and a water supply pipe 51. Into this receptacle the filtering material may be placed in suitable quantity and subjected to a stream of water from the pipe 51. 52 is a plunger situated in the receptacle 49 and adapted to be reciprocated up and down by a handle 53 with which it is connected by a link 54. It will be understood that by the reciprocation of such plunger, a stream of water being introduced at the same time, the filtering material will be thoroughly cleansed and the impurities will pass away with the waste water through the perforations in the bottom of the receptacle 49 and thence through the waste pipe 55.

In operation the casing 7 is charged with a suitable cooling material, the desired current is conducted to the electrodes 33 and 34, and the fermented beer or other liquid to be treated is conducted to the vessel 19 through the pipe 30. At the same time the said vessel is rapidly revolved, say at a rate of one thousand revolutions, and the liquid carried rapidly around in contact with the said electrodes and also forced out against and through the straining or filtering walls of the vessel. During this operation deleterious organisms are destroyed and their separation from the liquid facilitated, and such separation is effected first by the filtering walls of the vessel and lastly by the filtering bed in the base of the casing. The purified liquid then passes out through the pipe 46 for use or for further treatment as may be desired.

We have shown in the drawing the method we prefer for supplying sterilized air to the casing 1. Atmospheric air is forced by a pump 56 into a furnace 57 where it is highly heated to kill any germs. It then passes through a cooling coil 58 into an air filter 59 the filtering bed of which is composed of some fibrous material such as cotton or small pieces of sponge, tightly packed, situated in a vessel 60 adapted to be supplied with brine by a pipe 61. From this filter, where the air is further cooled and purified, it passes in a sterilized condition directly into the pipe 32, which conducts it to the casing 1.

We claim—

1. The herein described process for the purification of liquids which consists in subjecting the liquid to the simultaneous actions of centrifugal and electrical forces, and filtering the liquid by the aid of the said centrifugal force, substantially as set forth.

2. The herein described process for the purification of beer or other beverage, consisting in filtering the same by centrifugal force, while under the action of electrolytic force and under air or gas pressure, substantially as set forth.

3. In an apparatus for the purification of liquids the combination of a rotary perforated or straining vessel adapted to hold the liquid, electrodes therein, and means for rotating the vessel, substantially as set forth.

4. The combination of a rotary vessel adapted to hold the liquid, electrodes therein, means for filtering the liquid, and mechanism for rotating the vessel, substantially as set forth.

5. The combination of a casing, a rotary vessel therein, electrodes extending through said casing into the vessel, mechanism for rotating said vessel, and filtering or straining devices, substantially as set forth.

6. The combination of a casing, a rotary vessel therein having straining or filtering means, electrodes in the vessel, a strainer or filter at the bottom of the casing, and mechanism for rotating the vessel, substantially as set forth.

7. The combination of an air tight casing, electrodes and a rotary filtering or straining vessel therein, means for supplying air or gas pressure to the surface of the liquid in the casing or vessel, and mechanism for rotating the latter, substantially as set forth.

8. As a means for washing filtering material the combination of the vessel 49 having the water supply and the perforated or equivalent bottom 50, and the plunger 52, substantially as set forth.

In testimony whereof we affix our signatures in the presence of two witnesses.

LOUIS WAGNER.
JOHN MARR.
HENRY CAMPBELL.

Witnesses:
J. G. HOPKINS,
H. N. LOW.